United States Patent [19]
Bucholtz et al.

[11] Patent Number: 4,739,661
[45] Date of Patent: Apr. 26, 1988

[54] FIBER-OPTIC ACCELEROMETER HAVING CANTILEVERED ACCELERATION-SENSITIVE MASS

[75] Inventors: Frank Bucholtz, Crofton, Md.; Alan Kersey, Springfield; Anthony Dandridge, Alexandria, both of Va.

[73] Assignee: United States of America as represented by the Secretary of the Navy

[21] Appl. No.: 37,271

[22] Filed: Apr. 10, 1987

[51] Int. Cl.[4] .................. G01P 15/08; G01H 9/00
[52] U.S. Cl. ..................... 73/517 R; 73/653; 250/227; 250/231 R
[58] Field of Search .............. 73/517 R, 651, 653, 73/655, 800; 250/227, 231 R; 356/345

[56] References Cited

U.S. PATENT DOCUMENTS 4,466,295 8/1984 Wesson ..................... 73/517 R X

OTHER PUBLICATIONS

A. Kersey, F. Bucholtz, and A. Dandridge, "New Nonlinear Phase Conduction Method for DC Measurand Interferometric Fibre Sensors," *Electronics Letters*, vol. 22, No. 2, (Jan. 16, 1986), pp. 75–76.

F. Bucholtz, A. Kersey and A. Dandridge, "DC Fibre-Optic Accelerometer with Sub-$\mu$g Sensitivity," *Electronics Letters*, vol. 22, No. 9, (Apr. 24, 1986), pp. 451–453.

*Primary Examiner*—John Chapman
*Attorney, Agent, or Firm*—Thomas E. McDonnell; Andrew M. Lesniak

[57] ABSTRACT

An optical fiber accelerometer with a rectilinear actuator, such as a push rod, acting on a middle region of an optical fiber pass tautly strung between two supports so that linear actuator motion during sensed acceleration causes lateral displacement of the pass's middle region causing nonlinear (i.e., quadratic) strain in the fiber. This nonlinear response allows the accelerometer to detect acceleration signals in a noisy, low-frequency signal environment through use of a high frequency signal carrier whose amplitude is determined by a low-frequency measured acceleration signal using an optical fiber interferometer.

11 Claims, 1 Drawing Sheet

FIBER-OPTIC ACCELEROMETER HAVING CANTILEVERED ACCELERATION-SENSITIVE MASS

SPECIFICATION

This invention relates to fiber-optic accelerometers and relates in particular to ones utilizing nonlinear displacement-to-strain conversion (NDSC) as a technique for measuring acceleration.

BACKGROUND OF THE INVENTION

Fiber optic interferometric sensors rely on phase shifts induced between two arms of an interferometer by an external field (measurand). These sensors can be used as accelerometers by incorporating them with other components to build the accelerometers. In all previous applications where the fiber optic accelerometers are used, the field does not act directly on the fiber but rather on a transducing material to which one arm of the fiber interferometer is attached and, with very few exceptions, the strain induced in the transducing material is linearly proportional to the strength of the external field. Optical fiber attached to the material to measure strain directly therefore responds linearly to the field. It is desirable, on the other hand that the response be nonlinear.

Nonlinear response is desirable because the important frequency components of many measurands of interest lie, unfortunately, in the low frequency range, typically less than ten (10) Hertz (Hz), or cycles per second, where interference from environmental noise sources such as thermal and mechanical fluctuations, is most severe. As a result, the shot-noise-limited sensitivity of an accelerometer incorporating a fiber interferometer can be achieved in practice only at frequencies above 10-100 Hz. However, if the phase shift (sensor output) depended quadratically on the total measurand then the problems associated with low-frequency noise could be overcome by mixing the low-frequency measurand with a high-frequency dither supplied by the sensor itself. The low-frequency measurand then modulates the phase shift at the dither frequency and the measurement can be made at a frequency (the dither frequency) where environmental noise is acceptably low.

SUMMARY OF THE INVENTION

It is an object of the invention to provide a fiberoptic accelerometer that responds nonlinearly to sensed acceleration.

The invention provides one or more passes of optical fiber tautly supported between two fixed points of support, and means for mechanically coupling a middle portion of a pass of the optical fiber to a cantilever via an acceleration-sensitive means and a dithering element E so that any acceleration component along a line passing from the fiber pass midpoint to the center of gravity of a mass m causes lateral flexure of the cantilever. The resultant lateral displacement of the middle portion of the pass of optical fiber in turn yields nonlinear displacement-to-strain conversion as the fiber stretches or relaxes under the influence of the flexing cantilever, the acceleration-sensitive mass m, and the dithering element E.

DETAILED DESCRIPTION OF THE PREFERRED EMBODIMENT

Figure 1:
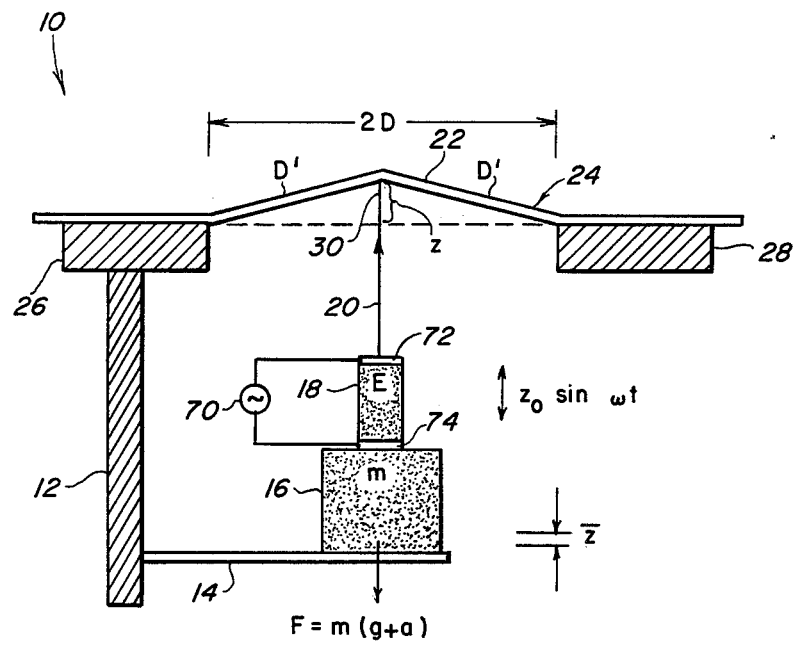
FIG. 1 of the drawings shows in schematic form a preferred embodiment of the invention.

An optical fiber accelerometer 10 schematically shown in FIG. 1 comprises a stationary support 12, a cantilever 14 attached at one of its ends to support 12, an acceleration-sensitive mass m, labelled 16, mounted on the free end of cantilever 14 and secured thereto, a dithering element E, labelled 18, directly coupled mechanically to mass 16, a quartz push rod 20 coupled directly to element 18 and mass 16, and also coupled directly to a middle portion 22 of a pass 24 of optical fiber secured to laterally spaced fixed supports 26 and 28 between which the fiber pass 24 extends in a taut condition with upper end 30 of push rod 20 pressing on middle portion 22. Cantilever 14 has an inherent flexibility utilized to advantage in the invention because it is designed to function optimally with the chosen mass m.

A power supply 70 delivers an oscillating signal to dithering element 18. Where element 18 is a pizeoelectric element the supply 70 connects to electrodes 72 and 74 sandwiching the element 18 therebetween. Supports 26 and 28 can be diametrically opposed segments of a ringlike substrate rigidly secured to stationary support 12.

Figure 2:
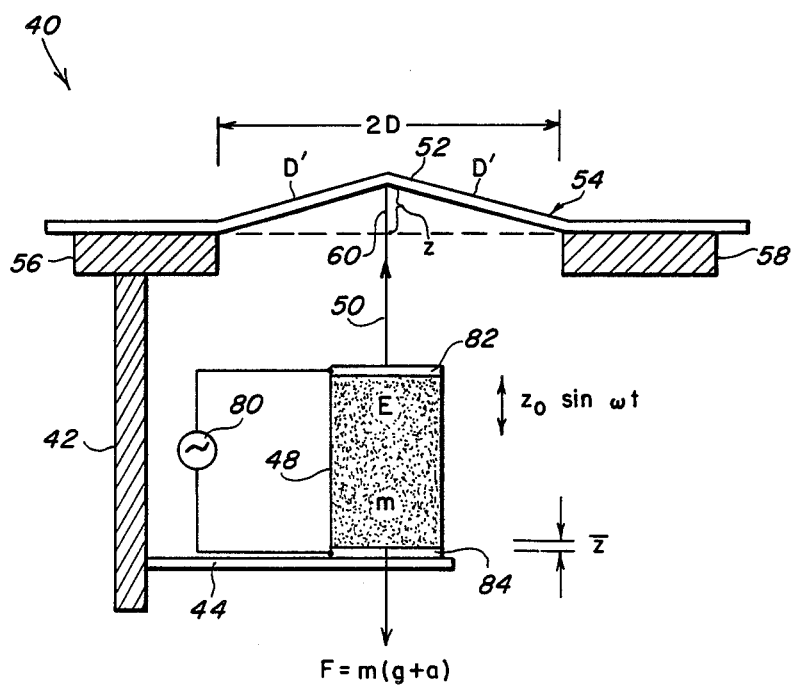
FIG. 2 of the drawings shows in schematic form another preferred embodiment of the invention.

An optical fiber accelerometer 40 schematically shown in FIG. 2 comprises a stationary support 42, a cantilever 44 attached at one of its ends to support 42, an acceleration-sensitive mass m, mounted on the free end of cantilever 44 and secured thereto integral with a dithering element E, the two components together being labelled 48, a push rod 50 coupled directly to the dual-component 48, and also coupled directly to a middle portion 52 of a pass 54 of optical fiber secured to laterally spaced supports 56 and 58 between which the fiber pass 54 extends in a taut condition with upper end 60 of push rod 50 pressing on middle portion 52.

The optical fiber accelerometer 40 is similar to accelerometer 10, except that mass m and dithering element E are integral in a single component, and are not separate components as in the accelerometer 10. The dual-component 48 can be an electromechanical element, such as a piezoelectric element, coupled, as shown in FIG. 2, to a power supply 80 delivering an oscillating signal to the pizeolelectric element 48 via metal electrodes 82 and 84 contacting element 48 sandwiched therebetween.

In many applications, the accelerometer of FIG. 1 is constructed as earlier described with a pizeoelectric element as dithering element 18 coupled to mass 16, and in such instances the pizeoelectric element would be powered by a power supply 70, that delivers an oscillating signal to the pizeoelectric element in an obvious manner.

Operation of the devices 10 and 40 is as follows: A length 2D of fiber pass 24/54 incorporated in one arm of an interferometer (not shown) is attached to the supports 26, 28/56,58. In response to an acceleration of the assembled device 10/40, a transducer comprised of mass m and element E together with push rod 20/50 produces a lateral deflection z of the midpoint 22/52 of fiber pass 24/54 where the topmost rod end 30/60 engages the taut fiber pass. The resulting axial elongation of the fiber pass 24/54 is $2\Delta D = Z^2/D$ where $2\Delta D$ = total change in length of fibre pass 24/54
$z^2$ = the square of the push rod displacement z
D = the distance from either secured end of fibre pass 24/54 to its midpoint and is assumed that z<<D. To a good approximation, the induced phase shift is $\phi = (2\pi/\lambda)(z^2/D)$ where $\phi$ = phase shift
$\lambda$ = free-space wavelength of a laser used in the interferometer discussed above
D = half the distance between the secured ends of the fibre pass 24/54

The phase-shift depends quadratically, hence nonlinearly, on the acceleration causing displacement z of the midpoint of the fibre pass 24/54.

The length of fiber pass 24/54 in FIGS. 1 and 2 is shown as D' plus D' or 2D', indicating that the fiber pass has been stretched to a length exceeding 2D, the fixed span between supports 26/56 and 28/58. The lateral displacement z of the pass 24/54 is measured normal to a dotted line shown in FIGS. 1 and 2.

The invention permits a fiber-optic interferometer to provide nonlinear response to acceleration-induced displacement of the center point of a optical fiber pass through the coaction of cantilever-supported components with the pass strained in accordance with lateral flexure of the cantilever due to total force F=m(g+a) on the cantilever by a mass m acting under the influence of gravity g(g=9.8 meters per square second) and acceleration a and in accordance with a dither $z_O \cos wt$ applied by element E, where the total displacement $z=z+z_O \cos wt$ is brought about in the position of fiber pass midpoint. z is the dc or low frequency displacement due to the dc or low frequency.

The invention permits a nonlinear phase shift $\phi$ to be obtained in coherent light conveyed through fiber pass 24/54. The invention allows the measurement of static (time invariant) or low frequency acceleration for which a suitable transducer (element E and mass m in any combination) is used. This accomplished by upconverting the signal from one that is time invariant or low frequency to a dither frequency $\omega$ well above the range where environmental noise is important.

Obviously many modifications and variations of the invention are possible in light of the above teachings. It is therefore to be understand that within the scope of the appended claims the invention may be practiced otherwise than as specifically described.

What is claimed and desired to be secured by Letters Patent of the United States is:

1. In a fiber-optic accelerometer the combination comprising:
   a cantilever;
   means for sensing acceleration of said accelerometer, said means comprising an acceleration-sensitive mass m supported by said cantilever and comprising a dithering element E mechanically coupled to said mass in or integral with said mass m;
   a pass of optical fiber tautly supported between two points of support; and
   means for mechanically coupling a middle portion of said pass of optical fiber to said cantilever via said mass m and said dithering element E to cause lateral displacement of said middle portion due to coaction of said mass m and said dithering element E when acceleration of said mass m causes lateral flexure of said cantilever correlated to the direction of acceleration.

2. The accelerometer of claim 1 wherein said mass m and said dithering element E are mechanically coupled separate components.

3. The accelerometer of claim 2 wherein said dithering element is a pizeoelectric element.

4. The accelerometer of claim 3 wherein a power supply connected across said pizeoelectric element delivers an oscillating signal.

5. The accelerometer of claim 1 wherein said mass m and said dithering element E are integral within a single component.

6. The accelerometer of claim 5 wherein said single component is a pizeoelectric element.

7. The accelerometer of claim 6 wherein a power supply connected across said pizeoelectric element delivers an oscillating signal.

8. In a fiber-optic accelerometer, the combination comprising:
   a cantilever;
   an acceleration-sensitive mass m supported by said cantilever;
   a dithering element E mechanically coupled to said mass m;
   a push rod coupled to said cantilever via said mass m and said dithering element E;
   a pass of optical fiber tautly supported between two points of support with said push rod pressing on a middle portion of said pass of optical fiber to cause lateral displacement of said middle portion due to coaction of said mass m and said dithering element E when acceleration of said mass m causes lateral flexure of said cantilever correlated to the direction of acceleration.

9. In a fiber-optic accelerometer, the combination comprising:
   a cantilever;
   an acceleration-sensitive mass m serving as a dithering element E, said element E being supported by said cantilever;
   a push rod coupled to said mass m and said dithering element E;
   a pass of optical fiber tautly supported between two points of support with said push rod pressing on a middle portion of said pass of optical fiber to cause lateral displacement of said middle portion due to coaction of said mass m and said dithering element E when acceleration of said mass m causes lateral flexure of said cantilever correlated to the direction of acceleration.

10. In a fiber-optic accelerometer, the combination comprising:
   means for supporting an acceleration-sensitive mass m to allow displacement of the mass m when subjected to acceleration;
   means (E) for dithering the mechanical position of an element coupled to said mass m;
   a pass of optical fiber supported between two fixed points of support provided by a ring-like substrate; and
   means for mechanically coupling a middle portion of said pass of optical fiber to said supporting means via said mass m and said dithering means (E) to cause lateral displacement of said middle portion due to coaction of said mass m and said dithering means (E) when acceleration of said mass M causes lateral flexure of said supporting means, the flexure correlated to the direction of acceleration.

11. In the accelerometer of claim 10, wherein said supporting means comprises a cantilener allowing said displacement of said mass m, whereby said accelerometer is highly sensitive to acceleration and/or change in acceleration.

* * * * *